United States Patent [19]

Rubel

[11] Patent Number: 4,779,895
[45] Date of Patent: Oct. 25, 1988

[54] VEHICLE SUSPENSION
[75] Inventor: Erich Rubel, Ludwigsburg, Fed. Rep. of Germany
[73] Assignee: Robert Bosch GmbH, Stuttgart, Fed. Rep. of Germany
[21] Appl. No.: 81,070
[22] Filed: Aug. 3, 1987
[30] Foreign Application Priority Data
  Sep. 19, 1986 [DE] Fed. Rep. of Germany ....... 3631876
[51] Int. Cl.$^4$ ............................................. B60G 17/10
[52] U.S. Cl. .................................... 280/707; 280/714
[58] Field of Search ................................. 280/707, 714
[56] References Cited
U.S. PATENT DOCUMENTS
  3,741,582  6/1973  Eckert .................................. 280/714

FOREIGN PATENT DOCUMENTS
  2738455  3/1979  Fed. Rep. of Germany .
  3414257  10/1985  Fed. Rep. of Germany .

Primary Examiner—Kenneth R. Rice
Attorney, Agent, or Firm—Edwin E. Greigg

[57] ABSTRACT

A vehicle suspension for motor vehicles in which a semi-active suspension is combined with an active suspension to make a novel suspension. The pump power of the active suspension, however, is designed merely for overcoming the necessary frictional forces. The advantage is that for such a vehicle suspension, a lightweight pump of low power, small diameter lines, and a small 4/3-way magnetic valve requiring little current can be used.

6 Claims, 2 Drawing Sheets

VEHICLE SUSPENSION

BACKGROUND OF THE INVENTION

The invention is based on a vehicle suspension system as defined hereinafter. A vehicle suspension of this type is known (German Offenlegungsschrift No. 34 14 257) which is the same as U.S. Pat. No. 4,655,440.

With a suspension of the type described in said patent, the passage from one side of the shock absorber to the other is monitored by a valve device that is electromagnetically actuatable. This kind of semiactive suspension is markedly better than a passive suspension.

An active suspension, such as that known from German Offenlegungsschrift No. 27 38 455, has a high-pressure pump, a high-pressure reservoir and corresponding metering valves, and because all of these components must be designed for very high power (up to 5 kw per wheel), this type of suspension is very expensive and is uneconomical for conventional vehicles.

It is known that on a very good road, friction predominates in a vehicle suspension. Complicated and expensive control of a shock absorber is even less advantageous, the better the road and the greater the friction in the vehicle suspension.

OBJECT AND SUMMARY OF THE INVENTION

In a vehicle suspension of the type discussed at the outset above, these disadvantages are overcome by means of the novel features of this invention.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
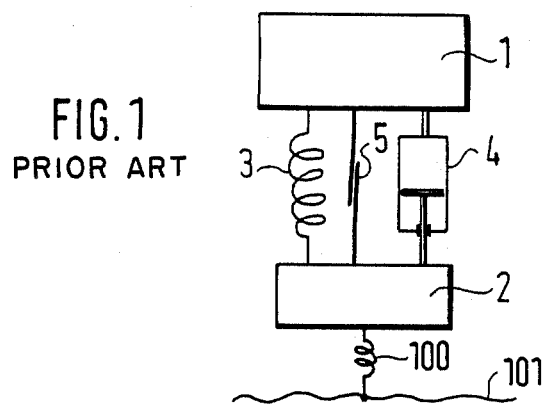
FIG. 1 shows a passive suspension.

The passive suspension system shown in FIG. 1 has a steel spring 3 of any well known type such as a coil spring disposed between a vehicle mass 1 and a wheel mass 2, for suspension of the vehicle body; parallel to the steel spring, it has a conventional shock absorber 4. A friction component represented in schematic form is identified by reference numeral 5.

Figure 2:
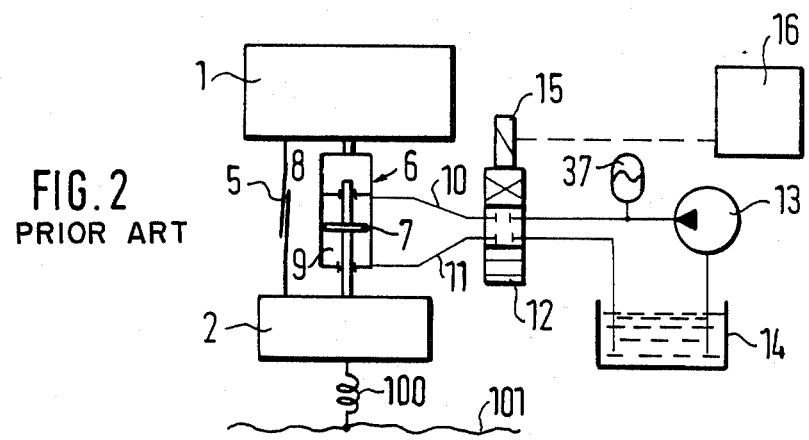
FIG. 2 shows an active suspension.

The suspension of FIG. 2 is also known, and using the same reference numerals for equivalent elements—it has a spring functional element 6 between the vehicle mass 1 and the wheel mass 2, the spring functional element having a piston 7 that divides two fluid filled work chambers 8 and 9 from one another. Each work chamber 8 and 9 is connected via a respective fluid flow line 10 and 11 to a 4/3-way magnetic valve 12, which monitors the communication of the fluid filled work chambers 8 and 9 with a fluid pump 13 which provides fluid for one of the work chambers or a reservoir 14 to which fluid is returned from one of the work chambers.

An electromagnet 15 of the magnetic valve 12 is connected to an electronic control device 16, to which signals from level sensors or the like are directed in order to adapt the vehicle suspension to given vehicle or road conditions.

The 4/3-way valve, in its middle position, blocks off the fluid flow communication between the work chambers 8 and 9 and the pump 13 or reservoir 14. In its second and third position, it establishes such fluid flow communication, that is, fluid flow communication of the pump with the upper work chamber 8 or fluid flow communication of the pump with the lower work chamber 9, each with an opposite reservoir connection for fluid returning from the work chamber to which fluid is not directed by the pump.

Figure 3:
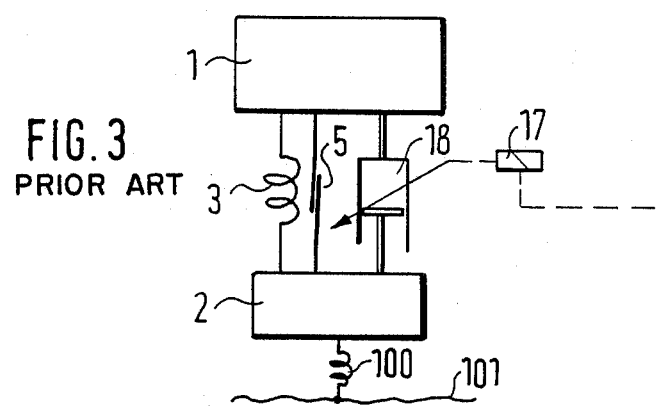
FIG. 3 shows a semi-active suspension.

In FIG. 3—again using the same reference numerals for equivalent elements—the vehicle suspension includes a shock absorber 18 that is controllable via a magnet 17. A spring 3 (steel or pneumatic or hydraulic/pneumatic) and a friction component 5 are shown between the vehicle mass 1 and the wheel mass 2. Once again, this kind of vehicle suspension is known; it is called semi-active.

Figure 4:
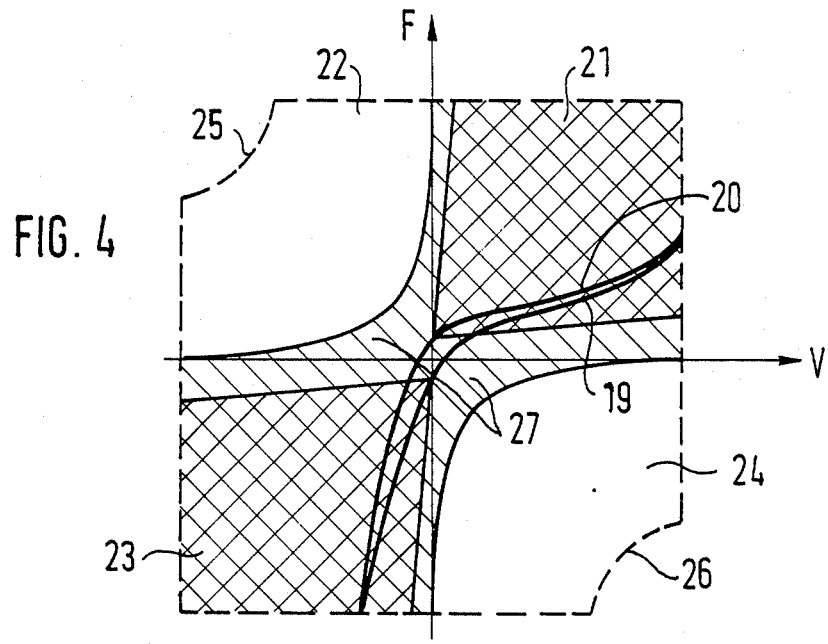
FIG. 4 is a diagram relating to shock absorber operating ranges.

FIG. 4, is a diagram in which the shock absorber force F is plotted on the ordinate and the piston speed V is plotted on the abscissa. The diagram shows the mode of operation of a passive mass-produced shock absorber of the type of FIG. 1, the characteristic curves of which are numbered 19 and 20. The active suspension of FIG. 2 operates in four quadrants 21, 22, 23 and 24, and the semi-active suspension of FIG. 3 operates in the two quadrants 21 and 22. From the curves 25 and 26, it is apparent that the performance of the active suspension in quadrants 22 and 24 is limited by the power of the particular pump used. For example, if a power of 2 to 3 kW has to be furnished, then the required components such as the pump, high-pressure reservoir, lines and magnetic valve are correspondingly large, heavy and expensive.

Figure 5:
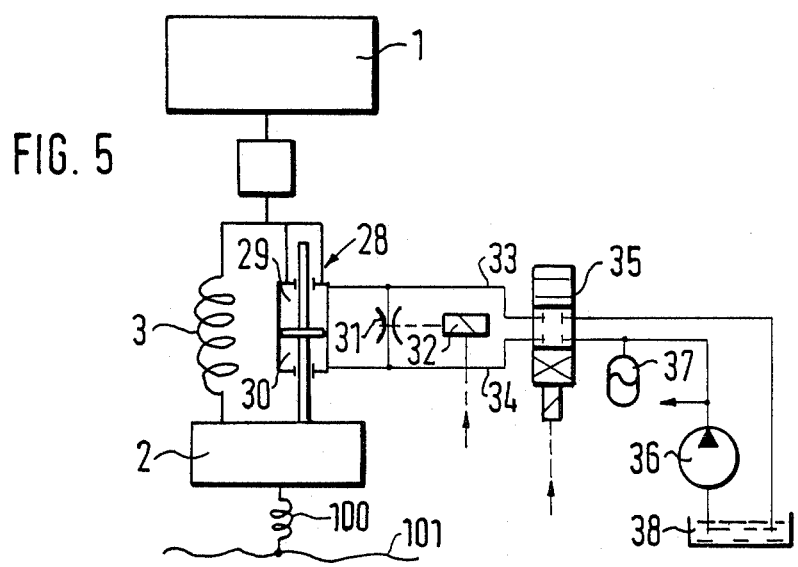
FIG. 5 shows a combination according to the invention of an active and a semi-active suspension.

According to the invention shown in FIG. 5, a semi-active suspension, like that shown in FIG. 3, is augmented with an active suspension of FIG. 2, but the latter is designed as merely strong enough that with it only the forces of friction can be overcome. The operating range 27 is represented in FIG. 4 by single-line shading.

In FIG. 5, the supporting spring and a controllable fluid damper shock absorber 28 are disposed between the vehicle mass 1 and the wheel mass 2. The shock absorber 28 is embodied as a balanced shock absorber, with identical work chambers 29 and 30 separated by a piston. A controllable throttle 31 is actuatable from a closed position to an open position via a magnet 32. The magnet 32 is controlled via a computer, which operates as a function of spring travel, shock absorber force, wheel acceleration and vehicle body acceleration. The computer also controls the pump 36 and the magnet of a 4/3-way magnetic valve 35. The magnet controls the throttle 31 which is closed whenever the valve 35 is in an active position. Two fluid conducting lines 33 and 34, that is, an upper and lower line are connected to the respective chambers 29 and 30 of the shock absorber 28 and to a 4/3-way magnetic valve 35. This magnetic valve 35 serves to monitor the communication of a pressure supply apparatus, comprising a pump 36, a pressure reservoir 37 and a fluid reservoir 38 and controls fluid flow from and to the shock absorber 28. The controllable cross section of the 4/3-way magnetic valve 35 is relatively small, in fact so small that the power controlled by the magnetic valve 35 is sufficient merely to overcome the forces of friction in the entire suspension.

The nucleus, and the advantage, of the present invention is that the small proportion of the frictional force in the entire force, amounting to only a few per cent, can be adequately compensated for by an installed pump power of only 50 to 100W per vehicle wheel. The components necessary for the installation of so little power are smaller and lighter in weight and considerably more economical in comparison with an active suspension. While the very stringent demands for rapidity of the 4/3-way magnetic valve 12 in the active suspension of FIG. 2 present a great many problems, the dynamic demands made of the small 4/3-way magnetic valve 35, which requires only very little current and serves merely to compensate for friction, are very easily met.

With very low piston speeds in the shock absorber 28, the suspension of FIG. 5 functions like an active suspension, with all its advantages, especially on a good road surface. At higher piston speeds, which lead to forces above the friction threshold, the suspension of FIG. 5 functions like a semi-active suspension.

The separate manner of construction shown in FIG. 5 of the shock absorber valve (throttle 31 and magnet 32) and 4/3-way magnetic valve 35 can also be replaced by a manner of construction combining them into a single block.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A vehicle suspension for motor vehicles having a shock absorber, said shock absorber comprises a semi-active suspension supplemented with an active suspension equipped with a fluid energy supply system having a pump (13, 36) and reservoir (37), a first magnetic valve for controlling fluid from said pump to said shock absorber, a second magnetic valve (31) for controlling fluid in a line parallel with said shock absorber, means for varying an electrical signal to said first and second magnetic valves, and said pump has an output power equivalent to from 50 to 100W per wheel and is dimensioned to produce an output power which is only sufficient for overcoming frictional forces in said shock absorber (28).

2. A vehicle suspension as defined by claim 1, which includes a 4/3-way magnetic valve (35) for controlling the shock absorber (28), said 4/3-way magnetic valve having a controllable cross section which is so small that the controlled power is sufficient merely for overcoming the frictional forces in the entire suspension.

3. A vehicle suspension as defined by claim 1, in which said magnetic valve includes a throttle (31) and a magnet (32) for varying the shock absorber fluid constant, and said 4/3-way magnetic valve (35) for controlling the energy supply are combined into a common valve block.

4. A vehicle suspension as defined by claim 2, in which said magnetic valve includes a throttle (31) and a magnet (32) for varying the shock absorber fluid constant, and said 4/3-way magnetic valve (35) for controlling the energy supply are combined into a common valve block.

5. A vehicle suspension for motor vehicles comprising a shock absorber, said shock absorber including upper and lower identical work chambers, separated by a piston, a 4/3way magnetic valve, first and second fluid lines connectd at one end to said upper and lower work chambers and at the opposite end to said 4/3way magnetic valve, a third fluid line connected to said first and second fluid lines between said 4/3way magnetic valve and said shock absorber in parallel with said upper and lower work chambers, a variable throttle valve in said third fluid line, a fourth fluid line connected from said 4/3way magnetic valve to a reservoir, a fifth fluid line connected from said 4/3way magnetic valve to said reservoir, a pump connected in said fifth fluid line and a reservoir connected between said pump and said 4/3way magnetic valve.

6. A vehicle suspension for motor vehicles as set forth in claim 5 which includes a computer which controls said variable throttle valve and said 4/3way magnetic valve whereby said variable throttle valve is closed when said 4/3way magnetic valve is activated and said variable valve is open when said 4/3way magnetic valve is not activated.

* * * * *